(12) United States Patent
Pang et al.

(10) Patent No.: US 11,295,411 B2
(45) Date of Patent: Apr. 5, 2022

(54) IMAGE SCALING METHOD BASED ON LINEAR EXTENSION/CONTRACTION MODE

(71) Applicants: ZHEJIANG UNIVERSITY NIT, Zhejiang Province (CN); INSTITUTE OF APPLIED MATHEMATICS HEBEI ACADEMY OF SCIENCES, Hebei (CN)

(72) Inventors: Chaoyi Pang, Queensland (AU); Huanyu Zhao, Hebei (CN); Tongliang Li, Hebei (CN)

(73) Assignees: ZHEJIANG UNIVERSITY NIT; INSTITUTE OF APPLIED MATHEMATICS HEBEI ACADEMY OF SCIENCES

( * ) Notice: Subject to any disclaimer, the term of this patent is extended or adjusted under 35 U.S.C. 154(b) by 46 days.

(21) Appl. No.: 16/346,488

(22) PCT Filed: Dec. 6, 2017

(86) PCT No.: PCT/CN2017/114846
§ 371 (c)(1),
(2) Date: Apr. 30, 2019

(87) PCT Pub. No.: WO2019/090876
PCT Pub. Date: May 16, 2019

(65) Prior Publication Data
US 2021/0327021 A1    Oct. 21, 2021

(30) Foreign Application Priority Data
Nov. 9, 2017    (CN) .......................... 201711123736.8

(51) Int. Cl.
*G06T 3/40*    (2006.01)

(52) U.S. Cl.
CPC ..................................... *G06T 3/40* (2013.01)

(58) Field of Classification Search
CPC .............. G06T 3/4007; G06K 15/1843; G06K 9/6215; G09G 3/2081; G09G 3/2055;
(Continued)

(56) References Cited

U.S. PATENT DOCUMENTS

| 8,643,650 B1 * | 2/2014 | Vinchon | ............... G06F 17/175 |
| | | | 345/442 |
| 9,978,118 B1 * | 5/2018 | Ozguner | ............... G06F 12/128 |

FOREIGN PATENT DOCUMENTS

| CN | 103366342 | 10/2013 | ............... G06T 3/40 |
| CN | 105488758 | 4/2016 | ............... G06T 3/40 |
| CN | 106960059 | 7/2017 | ............. G06F 17/30 |

OTHER PUBLICATIONS

Dong et al., "Image Super-Resolution Using Deep Convolutional Networks," IEEE Transactions on Pattern Analysis and Machine Intelligence (TPAMI), Preprint, 2015 (14 pgs).
(Continued)

*Primary Examiner* — Phuoc H Doan
(74) *Attorney, Agent, or Firm* — Hayes Soloway P C

(57) ABSTRACT

An image scaling method based on a linear extension/contraction mode, includes step I: compressing an original image matrix composed of image pixels in a row by row manner with a Linearlization or OptimalPLR compression method to obtain a line segment segmentation form; step II: lengthening the line segments under Policy I or shortening the line segments under Policy II by resampling at a upscaling or downscaling factor, to obtain an upscaled or downscaled image in the row direction; and step III: upscaling the data upscaled in the row direction in the step II in a column by column manner through the process in the step II, to obtain an image upscaled in the column direction. The method which is an image scaling technique directly based
(Continued)

on PLA for data compression, not only can compress static image data, but also can compress image data of dynamic data streams.

7 Claims, 8 Drawing Sheets

(58) Field of Classification Search
CPC . G09G 5/10; H01L 27/14625; H01L 27/1462; G02B 5/1828; G06N 3/10; H04N 13/0207; G01C 11/025
See application file for complete search history.

(56) References Cited

OTHER PUBLICATIONS

Dong et al., "Optimized Image Resizing Using Seam Carving and Scaling," ACM Transactions on Graphics, Association for Computing Machinery, 2009 29 (5) (11 pgs).
Dong et al., "Learning a Deep Convolutional Network for Image Super-Resolution," Proceedings of European Conference on Computer Vision (ECCV), 2014 (16 pgs).
International Search Report (w/translation) and Written Opinion (w/machine translation) issued in application No. PCT/CN2017/114846, dated Jul. 27, 2018 (12 pgs).
Kang et al., "Fast Digital Zooming System Using Directionally Adaptive Image Interpolation and Restoration," SpringerPlus 2014, 3:713 (9 pgs).
Kopf et al., "Content-Adaptive Image Downscaling," SIGGRAPH Asia 2013 (8 pgs).
Liu et al., "Novel Online Methods for Time Series Segmentation," IEEE Transactions on Knowledge and Data Engineering, vol. 20, No. 12, Dec. 2008 (11 pgs).
Öztireli et al., "Perceptually Based Downscaling of Images," ACM Trans. Graph, Aug. 2015 (10 pgs).
Qi et al. "Indexable Online Time Series Segmentation with Error Bound Guarantee," World Wide Web, Mar. 2013 (39 pgs).
Romano et al., "RAISR: Rapid and Accurate Image Super Resolution," eprint arXiv:1606.01299, Jun. 2016 (31 pgs).
Romano et al., "Single Image Interpolation Via Adaptive Nonlocal Sparsity-Based Modeling," IEEE Transactions on Image Processing, May 2014 (14 pgs).
Sacharidis et al., "Hierarchically Compressed Wavelet Synopses," The VLDB Journal, 18(1):203-231 • Mar. 2009 (24 pgs).
Sun et al., "Image interpolation via collaging its non-local patches," Digital Signal Processing 49 (2016) 33-43 (11 pgs).
Wang et al., "High Quality Image Resizing," Neurocomputing, vol. 131, May 2014, pp. 348-356 (25 pgs).
Weber et al., "Rapid, Detail-Preserving Image Downscaling," SA'16 Technical Papers, Dec. 2016 (5 pgs).
Xie et al., "Maximum error-bounded Piecewise Linear Representation for online steam approximation," The VLDB Journal, Dec. 2014 (30 pgs).
Xu et al., "An Adaptive Algorithm for Online Time Series Segmentation with Error Bound Guarantee," EDBT 2012, Mar. 2012 (12 pgs).
Yu et al., "Performance Evaluation of Edge-Directed Interpolation Methods for Images," ACM International Conference Proceeding Series, Mar. 1, 2013 (11 pgs).
Zhao et al. "Segmenting Time Series with Connected Lines under Maximum Error Bound," Information Sciences 345 (2016) (8 pgs).
Zhao et al., "An Optimal Piecewise Linear Approximation Algorithm on Semi-connected Segmentation under $L\infty$ Metric," The School of Computer & Data Engineering, Zhejiang University (NIT), Ningbo; the Institute of Applied Mathematics, Hebei Acaedemy of Sciences, Shijiazhuang, China; The University of Melbourne, Melbourne, Australia; The University of Queensland, Brisbane, Australia; Apr. 2, 2017 (26 pgs).
Zhou et al., "Image Zooming Using Directional Cubic Convolution Interpolation," IET Image Processing, Aug. 2012 (9 pgs).

* cited by examiner

Function 1: Linearization (P)

Input: A time series $P=(p_1, p_2, \cdots, p_n)$
Output: Segmentation vector S 1: Push $p_1$ into S
2: Let *current* be the line passing $p_1$ and $p_2$
3: while (not finished P) do
4:    if (check whether *current* passes the coming point $p_i$) then
5:       Continue
6:    else
7:       Push $p_{i-1}$ into S
8:       Reset *current* To pass $p_{i-1}$ and $p_i$
9:       Continue
10:   end if
11: end while

Function 2: OptimalPLR (P, δ)

Input: A time series $P = (p_1, p_2, \cdots, p_n)$ and a fixed error bound $\delta$
Output: Segmentation vector S 1: Let *Ucurrent* be the line passing $(1, p_1, y-\delta)$ and $(2, p_2, y+\delta)$
   Let *Lcurrent* be the line passing $(1, p_1, y+\delta)$ and $(2, p_2, y-\delta)$
2: Set $t_{start}=p_1.X$
3: while (not finished P) do
4:    if (check whether *Ucurrent* or *Lcurrent* approximates point $p_i$ within $\delta$) Then
5:       Update *Ucurrent* or *Lcurrent* to approximate point $p_i$
7:       Continue
7:    else
8:       Push the start and end points of *Ucurrent* into S
9:       Reset *Ucurrent* to pass $(p_i.x, p_i.y-\delta)$ and $(p_{i+1}.x, p_{i+1}.y+\delta)$
       Reset *Lcurrent* to pass $(p_i.x, p_i.y+\delta)$ and $(p_{i+1}.x, p_{i+1}.y-\delta)$
10:      Update $t_{start}=p_i.X$
11:      Continue
12:   end if
13: end while

Fig. 1

Policy 1: (stretch segments)

Input: Segmentation vector S of $P = (p_1, p_2, \cdots, p_n)$ and ratio m
Output: the extended series $P'=(p'_1, p'_2, \cdots, p'_{n*m})$
1: Push out the first point $S_{current}$ from S
2: while (not finished S) do
3:   Push out the next point $S_{next}$ from S
4:   if ($S_{current} \cdot x=1$) then
5:     Set the values of points 1 to m as $p_1$
6:   end if
7:   if ($S_{next} \cdot X - S_{current} \cdot x=1$) then
8:     Set the values of points $S_{current} \cdot x*m+1$ to $S_{next} \cdot x*m$ as $p_{next}$
9:   else
10:     Let line $L_{current}$ pass point ($S_{current} \cdot x*m$, $S_{current} \cdot y$) and point ($S_{next} \cdot x*m$, $S_{next} \cdot y$)
11:     Set the values of points $S_{current} \cdot x*m+1$ to $S_{next} \cdot x*m$ as the integerized values on $L_{current}$
12:   end if
13:   Reset $S_{current} = S_{next}$
14: end while

Policy II (stretch segments)

Input: Segmentation vector S of $P = (p_1, p_2, \cdots, p_n)$ and ratio m
Output: the extended series $P' = (p'_1, p'_2, \cdots, p'_{n*m})$
1: Push out the first point $S_{current}$ from S
2: while (not finished S) do
3:   Push out the next point $S_{next}$ from S
4:   if ($S_{current} \cdot x=1$) then
5:     Set the values of points 1 to m as $p_1$
6:   end if
7:   Let line $L_{current}$ pass ($S_{current} \cdot x*m$, $S_{current} \cdot y$) and ($S_{next} \cdot x*m$, $S_{next} \cdot y$)
8:   Set the values of points $S_{current} \cdot x*m+1$ to $S_{next} \cdot x*m$ as the integerized values on $L_{current}$
9:   Reset $S_{current} = S_{next}$
10: end while

Policy I or II (shrink segments)
Input: Segmentation vector S of $P=(p_1, p_2, \cdots, p_n)$ and ratio m
Output: the shrunk series $P' = (p'_1, p'_2, \cdots, p'_{n*m})$
Description:
Resampling from P to construct P', i.e. $p'_1=p_1$, $p'_i=p_{1*m}$ ($1<i\leq n/m$)

Fig. 2

Alg 1.1: NaiveScale(Policy I)

INPUT: image I
OUTPUT: image O

Up-scaling:
1. Use Function 1 to construct segments on each row of image I
2. Use Policy I to stretch each segment and get image I'
3. Use Function 1 to construct segments on each column of image I'
4. Use Policy I to stretch each segment
5. Output image O

Down-scaling:
1. Use Function 1 to construct segments on each column of Image I
2. Use Policy I to shrink each segment and get image I'
3. Use Function 1 to construct segments on each row of image I'
4. Use Policy I to shrink each segment
5. Output image O

Alg 1.2: NaiveScale (Policy II)
By replacing Policy I with Policy II in Alg 1.1

---

Alg 2.1: PLAScale(Policy I)

INPUT: image I
OUTPUT: image O

Up-scaling:
1. Use Function 2 to construct segments on each row of image I
2. Use Policy I to stretch each segment and get image I'
3. Use Function 2 to construct segments on each column of image I'
4. Use Policy I to stretch each segment
5. Output image O

Down-scaling:
1. Use Function 2 to construct segments on each column of Image I
2. Use Policy I to shrink each segment and get image I'
3. Use Function 2 to construct segments on each row of image I'
4. Use Policy I to shrink each segment
5. Output image O

Alg 2.2: PLAScale (Policy II)
By replacing Policy I with Policy II in Alg 2.1

Fig. 3

IMAGE SCALING METHOD BASED ON LINEAR EXTENSION/CONTRACTION MODE

TECHNICAL FIELD

The present invention relates to an image scaling method based on a linear extension/contraction mode, and belongs to the image processing field.

BACKGROUND ART

Image scaling refers to an upscaling or downscaling operation of an original image. In fact, image upscaling is to increase the pixels of the original image, while image downscaling is to reduce the pixels of the original image. A high-performance image scaling method should accomplish image scaling as quickly as possible on a premise of ensuring the quality of the scaled image, and should prevent an image aliasing phenomenon incurred by image downscaling operation. Actually, an image scaling problem may be translated into an optimization problem and settled with machine learning techniques, the outputted image result of which can effectively avoid the phenomena such as aliasing and excessive smoothing, etc. However, most machine learning algorithms can't guarantee the time cost of scaling, owing to a fact that they have time complexity at a polynomial order. Though techniques based on resampling interpolation, such as bilinear, bicubic, or box sampling, etc. have linear time complexity, they are unsatisfactory to ensure the quality of the outputted image. Such image scaling methods often make a trade-off between local image information loss and time cost. Specifically, according to the review and analysis article "Performance Evaluation of Edge-directed Interpolation Methods for Noise-free Images" in 2013, a Directional Cubic Convolution Interpolation (DCCI) method attained a good application effect in "Image Zooming Using Directional Cubic Convolution Interpolation", which can be derived from the scores of Peak Signal Noise Ratio (PSNR) and Structural Similarity Index Measurement (SSIM) experimentally.

The method used in "Fast Digital Zooming System Using Directionally Adaptive Image Interpolation and Restoration" is similar to the method used in "Image Zooming Using Directional Cubic Convolution Interpolation", but consumed less time. In "Content-Adaptive Image Downscaling", a filtering method that regulates a core filter according to the content of the image to attain good image quality was put forward, and in "Rapid, Detail-Preserving Image Downscaling", a convolution filter was used to perform image downscaling.

In "Perceptually Based Downscaling of Images", optimization was carried out with the Structural Similarity Index Measurement (SSIM) as the indicator to obtain a downscaled image. In "Image Interpolation via Collaging Its Non-Local Patches", a spatial interpolation method that reconstructs an image by collaging low-resolution sub-images to create a high-resolution result was put forth. Compared with other structured spatial representation methods, such as the methods put forth in "Optimized Image Resizing Using Seam Carving and Scaling" and "Single Image Interpolation Via Adaptive Nonlocal Sparsity-Based Modeling", the method was very efficient and didn't require to solve a complex optimization problem. Recently, it has been proved that case-based and learning-based methods are efficient, because they can accurately reconstruct the details of an image. Among those methods, the methods put forth in "Learning a Deep Convolutional Network for Image Super-Resolution", "Image Super-Resolution Using Deep Convolutional Networks", "RAISR: Rapid and Accurate Image Super Resolution", and "High Quality Image Resizing" accomplish image upscaling operations by establishing an external database for images and learning the external database to obtain a function from a low-resolution image to a corresponding high-resolution image.

From the above overview of image scaling techniques, it is found that there is no research payoff on image scaling techniques on the basis of the data after segmented linear image compression.

Image compression techniques can greatly reduce the space required for image storage. More importantly, the compressed data is a transformed knowledge representation of the original pixel information, and this transformed data is helpful for subsequent image processing. Presently, there are a variety of image compression techniques, including discrete wavelet transform, symbol mapping, histogram, and piecewise linear approximation (PLA), etc. The PLA method has been widely applied owing to its simplicity and intuitiveness. The PLA method represents original pixels in a form of line segments (continuous, discrete, and semi-continuous), which can be used to process and approximate the original data efficiently. Viewed from the available literatures, most early-stage techniques attained the purpose of compression by setting a fixed quantity of segmented representations (or mean-square error) first and then minimizing the mean-square error (or quantity of segmented representations) between reconstructed pixels and original pixels. However, the metric of mean-square error ($L_2$ norm) can't ensure that the restored pixels are within a controlled error range, which limits the application of the compression techniques based on that metrics in many fields. In view of that problem, a variety of compression techniques based on maximum-error have been put forth recently. Those methods minimize the quantity of line segments by setting a maximum error (i.e., the difference value between reconstructed data and corresponding original pixels). PLA compression techniques based on maximum error are referred to as L-bound PLA. Among those techniques, the Feasible Space Window (FSW) method put forward by Liu et al. in "Novel Online Methods for Time Series Segmentation" sets a fixed start point first, and then builds up segments by seeking for a feasible segment representation space. Qi et al. have extended the idea of the FSW method in "Indexable Online Time Series Segmentation with Error Bound Guarantee" and "An Adaptive Algorithm for Online Time Series Segmentation with Error Bound Guarantee" to handle multi-dimensional data and form polynomial curve segmentation. Xie et al. have put forward an optimization method that has linear time complexity by maximizing the lengths of partial segments in "Hierarchically Compressed Wavelet Synopses" to produce a segmentation of non-continuous line segments with minimum number. Zhao et al. have put forward two methods in "Segmenting Time Series with Connected Lines under Maximum Error Bound" and "An Optimal Piecewise Linear Approximation Algorithm on Semi-Connected Segmentation under $L_{-\infty}$ Metric", which generate a result of continuous and optimized semi-continuous segments by optimizing the segmentation of adjacent line segments.

For image scaling operations, it is proven that case-based and learning-based methods can attain a good visual effect but involves high time cost; the techniques based on resampling interpolation have higher execution efficiency than the former methods, and are more suitable for processing low-resolution images. However, both types of techniques have limited efficiency in ultra-high-resolution image scaling in a big data environment.

Contents of the Invention

To solve the problems in image scaling, the present invention provides an image scaling method based on a linear extension/contraction mode, which can accomplish image scaling in less time and can greatly preserve the features of the original image. The technical scheme employed by the present invention to solve the technical problems is as follows:

An image scaling method based on a linear extension/contraction mode, comprising the following steps:

step I: compressing an original image matrix (1) composed of image pixels in a row by row manner with a Linearlization or OptimalPLR compression method to obtain a line segment segmentation form, which is the data after compression; suppose the original image matrix (1) is as follows:

$$I = \begin{bmatrix} i_{11} & i_{12} & \cdots & i_{1n} \\ i_{21} & i_{22} & \cdots & i_{2n} \\ \vdots & \vdots & \vdots & \vdots \\ i_{m1} & i_{m2} & \cdots & i_{mn} \end{bmatrix} \quad (1)$$

where, $i_{mn}$ is the pixel value in row m, column n in the original image matrix;

each row of data is denoted as $I_i = \{i_{i1}, i_{i2}, \ldots, i_{in}\}$, where, i is the subscript of row i, $I_i$ is regarded as the value of a time series, i.e., time series $SI = \{(1, i_{i1}), (2, i_{i2}), \ldots, (k, i_{ik}), \ldots, (n, i_{in})\}$, where, k=1, 2, ..., n;

the time series SI is compressed with the Linearlization or OptimalPLR compression method to obtain a compression result series Sc, the specific compression method is as follows:

(1) compressing with the Linearlization compression method as follows:

storing the first point $(1, i_{i1})$ in the time series SI in the compression result series Sc; forming a straight line $L_{current}$ with the point $(1, i_{i1})$ stored in the compression result series Sc and an adjacent point $(2, i_{i2})$ after that point in the time series SI, and judging whether an adjacent point $(3, i_{i3})$ after the point $(2, i_{i2})$ in the time series SI is in the straight line $L_{current}$; if the adjacent point $(3, i_{i3})$ is in the straight line $L_{current}$, further judging whether the follow-up adjacent point is in the straight line $L_{current}$, and so on sequentially, till a point $(k, i_{ik})$ in the time series SI is not in the straight line $L_{current}$; at that point, storing a point $(k-1, i_{i(k-1)})$ before the point $(k, i_{ik})$ not in the straight line $L_{current}$ in the compression result series Sc; then, taking the point $(k, i_{ik})$ not in the straight line $L_{current}$ as a new first point and repeating the above-mentioned steps, and so on, till the compression of $SI = \{(1, i_{i1}), (2, i_{i2}), (n, i_{in})\}$ is finished;

(2) compressing with the OptimalPLR compression method as follows:

specifying a maximum error δ, and $SI = \{(1, i_{i1}), (2, i_{i2}), \ldots, (k, i_{ik}), \ldots, (n, i_{in})\}$, adding or subtracting the maximum error δ to/from the vertical coordinate of each point starting from the first point $(1, i_{i1})$, utilizing two points $(1, i_{i1}-\delta)$ and $(2, i_{i2}+\delta)$ to form a maximum straight line $L_{max}$, utilizing two points $(1, i_{i1}+\delta)$ and $(2, i_{i2}-\delta)$ to form a minimum straight line $L_{min}$, and then making two judgments: firstly, judging whether a line segment composed of two points $(3, i_{i3}+\delta)$ and $(3, i_{i3}-\delta)$ corresponding to the third point $(3, i_{i3})$ is contained in an included angle space formed by the maximum straight line $L_{max}$ and the minimum straight line $L_{min}$ that intersect with each other; secondly, judging whether a line segment composed of two points $(3, i_{i3}+\delta)$ and $(3, i_{i3}-\delta)$ corresponding to the third point $(3, i_{i3})$ intersects with the maximum straight line $L_{max}$ or intersects with the minimum straight line $L_{min}$; if either of the results of the two judgments is positive, it indicates there is a straight line that makes the currently processed points $(1, i_{i1})$, $(2, i_{i2})$, and $(3, i_{i3})$ within the error limit of the δ; in that case, updating the slopes of the maximum straight line $L_{max}$ and the minimum straight line $L_{min}$ with the following formulae (2):

$$\begin{cases} L_{min}[1, k+1] = \max_{1 \le q < w \le k} \dfrac{(i_{iq} + \delta) - (i_{iw} - \delta)}{q - w} \\ L_{max}[1, k+1] = \min_{1 \le q < w \le k} \dfrac{(i_{iq} - \delta) - (i_{iw} + \delta)}{q - w} \end{cases} \quad (2)$$

where, $L_{min}[1, k+1]$ and $L_{max}[1, k+1]$ represent the slopes of $L_{min}$ and $L_{max}$ respectively in the case that the result of judgment on the $k^{th}$ point $(k, i_{ik})$ is positive;

q and w traverse all integral values within the interval [1, k], and $1 \le q < w \le k$;

further making the above two judgments on a line segment composed of the follow-up two points $(4, i_{i4}+\delta)$ and $(4, i_{i4}-\delta)$; if either of the results of the two judgments is positive, further updating the maximum straight line $L_{max}$ and the minimum straight line $L_{min}$ with the formulae (2), and so on, till the result of judgment on points $(k, i_{ik}+\delta)$ and $(k, i_{ik}-\delta)$ is negative; at that point, selecting the maximum straight line $L_{max}$ or the minimum straight line $L_{min}$ that is updated in the last time to calculate vertical coordinates $i_{i1}'$ and $i_{ik-1}'$ corresponding to x=1 and x=k-1 in the time series SI, and storing obtained first compression storage point $c_1=(1, i_{i1}')$ and second compression storage point $c_2=(k-1, i_{ik-1}')$ in the compression result series Sc;

the method for utilizing the maximum straight line $L_{max}$ or the minimum straight line $L_{min}$ that is updated in the last time to calculate a start point $(1, i_{i1}')$ and end point $(k-1, i_{ik-1}')$ is as follows:

the maximum straight line is $L_{max}=a_{max}x+b_{max}$, and the minimum straight line is $L_{min}=a_{min}x+b_{min}$, wherein, to obtain the vertical coordinates $i_{i1}'$ and $i_{ik-1}'$ corresponding to the two points $(1, i_{i1}')$ and $(k-1, i_{ik-1}')$ with $a_{max}$, $b_{max}$, $a_{min}$, and $b_{min}$, x=1 and x=k-1 must be substituted into the maximum straight line $L_{max}$ or the minimum straight line $L_{min}$ at the same time; for example, $i_{i1}'=a_{max}*1+b_{max}$ and $i_{ik-1}'=a_{max}*(k-1)+b_{max}$ are obtained when they are substituted into the maximum straight line $L_{max}$, and $i_{i1}'=a_{min}*1+b_{min}$ and $i_{ik-1}'=a_{min}*(k-1)+b_{min}$ are obtained when they are substituted into the minimum straight line $L_{min}$;

further taking follow-up two points $(k, i_{ik}-\delta)$ and $(k+1, i_{i(k+1)}+\delta)$ to form a maximum straight line $L_{max}$ and taking two points $(k, i_{ik}+\delta)$ and $(k+1, i_{i(k+1)}-\delta)$ to form a minimum straight line $L_{min}$, and repeating the above-mentioned process, and so on, till the processing of $SI=\{(1, i_{i1}), (2, i_{i2}), \ldots, (n, i_{in})\}$ is finished;

through the above-mentioned compression process, a compression result series $Sc=\{c_1, c_2, \ldots, c_i, \ldots, c_p\}$ is obtained for each row, where, p<n, and $c_i$ represents compression storage point i;

step II: lengthening the line segments under Policy I or Policy II or shortening the line segments by resampling at a corresponding upscaling or downscaling factor, to obtain an upscaled or downscaled image in the row direction, the specific method is as follows:

(1) obtaining an upscaled image in the row direction as follows:

with a presumption that the upscaling factor in the row direction is h, multiplying the horizontal coordinate $c_i.x$ of each compression storage point $c_i$ ($1 \leq i \leq p$) in the compression result series Sc by h, while keeping the vertical coordinate $c_i.y$ of that point unchanged, to obtain a set of compression storage points $\{(c_1.x*h, c_1.y), (c_2.x*h, c_2.y), \ldots, (c_i.x*h, c_i.y), \ldots, (c_p.x*h, c_p.y)\}$, where, $c_p.x=n$;

under the Policy I, if $c_{i+1}.x-c_i.x>1$, utilizing two adjacent compression storage points $(c_i.x*h, c_i.y)$ and $(c_{i+1}.x*h, c_{i+1}.y)$ to form a straight line and fill up the value of any point within the range of positions $(c_i.x*h, c_{i+1}.x]$; if $c_{i+1}.x-c_i.x=1$, utilizing $c_{i+1}.y$ directly to fill up the value of each point within the range of positions $(c_i.x*h, c_{i+1}.x*h]$;

under the Policy II, regardless of $c_{i+1}.x-c_i.x>1$ or $c_{i+1}.x-c_i.x=1$, utilizing the straight line formed by the two adjacent compression storage points $(c_i.x*h, c_i.y)$ and $(c_{i+1}.x*h, c_{i+1}.y)$ to fill up the value of any point within the range of positions $(c_i.x*h, c_{i+1}.x*h]$;

(2) obtaining a downscaled image in the row direction as follows:

with a presumption that the downscaling factor in the row direction is h, dividing the horizontal coordinate $c_i.x$ of each compression storage point $c_i$ ($1 \leq i \leq p$) in the compression result series Sc by h, while keeping the vertical coordinate $c_i.y$ of that point unchanged, to obtain a set of compression storage points $\{(c_1.x/h, (c_2.x/h, c_2.y), \ldots, (c_i.x/h, c_i.y), \ldots, (c_p.x/h, c_p.y)\}$, where, $c_p.x=n$;

here, utilizing a straight line formed by two adjacent compression storage points $(c_i.x/h, c_i.y)$ and $(c_{i+1}.x/h, c_{i+1}.y)$ to fill up the value of any point within the range of positions $(c_i.x/h, c_{i+1}.x/h]$;

step III: upscaling the data upscaled in the row direction in the step II in a column by column manner through the process in the step II, to obtain an image upscaled in the column direction, and thereby obtain an entire upscaled image; or downscaling the data downscaled in the row direction in the step II in a column by column manner through the process in the step II, to obtain an image downscaled in the column direction, and thereby obtain an entire downscaled image.

The beneficial effects attained by the method provided in the present invention are as follows:

(1) The step I in the present invention employs an image scaling technique directly based on PLA for data compression. The compression algorithm in the step I not only can compress static image data, but also can compress image data of dynamic data streams. Compared with other compression algorithms, the method has higher speed and occupies less memory. The scaling operations in the steps II and III are simple and intuitive, and are directly based on the data after compression without restoring the original image. In contrast, Kernel-based interpolation scaling techniques don't have the above-mentioned features.

(2) Other linear fitting algorithms, including algorithms under $L_2$ or $L_p$ metric, such as SW algorithm, topdown algorithm, downtop algorithm, and swab algorithm, etc. may be directly used in replacement of the algorithm in the step I in the method provided in the present invention. Therefore, the method has high flexibility. However, the topdown algorithm and downtop algorithm are inapplicable to compression of image data of dynamic data streams; the SW algorithm and swab algorithms are unsuitable for compression of image data of dynamic data streams because they can't ensure the quality of outputted image and can't control the error of each pixel.

(3) Utilizing the image scaling technique directly based on PLA for data compression in the step I, the method provided in the present invention can greatly preserve the features in the original image, the principle is as follows:

A. Within a limit that the maximum error δ is smaller than 0.5, the image compression with the method is lossless compression, i.e., the original image can be restored fully;

B. With a limit that the maximum error δ is smaller than 0.5, the method provided in the present invention have theoretic up-stability, i.e., the original image can be restored after it is upscaled at a factor n*n and then downscaled at a factor 1/n*1/n; the peak signal to noise ratio (PSNR) is Inf, and the structural similarity (SSIM) is 1.

C. Within a limit that the maximum error δ is smaller than 0.5, the method provided in the present invention has theoretic down-consistency, i.e., any straight line in the original image still maintains the feature of the straight line in the downscaled image.

BRIEF DESCRIPTION OF DRAWINGS

FIG. 1 shows pseudo-code description of the compression method in the present invention;

FIG. 2 shows pseudo-code description of the extension policies in the present invention;

FIG. 3 shows pseudo-code description of the scaling method in the present invention;

EMBODIMENTS

Hereunder the content and effects of the present invention will be further detailed in embodiments with reference to FIGS. 1-10.

Figure 4:
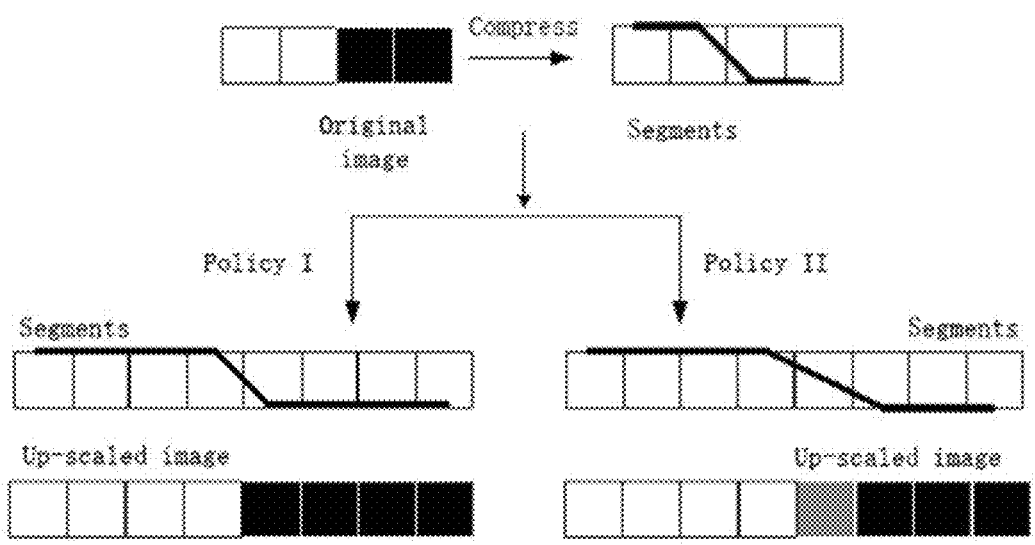
FIG. 4 is a schematic diagram of the extension policies in the scaling framework in the present invention.
Figure 5:
FIG. 5 shows the original image before scaling in an embodiment.

As shown in FIGS. 1-10, hereunder an image "Leena" (256*256 pixels) as an object is upscaled at a factor 2*2 under Policy II with a PLAScale method, wherein, Error=0.4. The original image is shown in FIG. 5.

Here, only the pixel information in the first row is shown here, for the sake of simplicity.

162 162 160 161 164 159 159 156 156 161 154 155 155 153
154 154 155 157 161 164 165 168 173 171 171 171 168
160 150 146 124 112 95 92 93 100 101 104 104 107 109
105 106 109 107 106 109 108 109 109 104 106 110 114
114 120 115 121 123 122 127 126 123 132 130 132 129
129 134 133 131 128 130 127 131 129 130 128 134 134

129 133 133 134 133 134 133 133 134 133 131 131 133
135 131 131 134 133 136 135 135 134 136 132 136 134
132 131 129 130 131 130 129 134 134 132 133 132 130
132 135 133 133 136 131 131 128 135 141 133 130 128
133 130 133 128 127 131 128 134 128 127 130 130 129
130 128 127 128 127 129 128 122 123 120 120 115 112
109 101 107 116 126 137 141 148 153 155 158 160 161
154 149 150 151 153 154 153 155 154 158 157 153 154
152 153 153 152 151 154 155 151 155 157 157 154 157
159 157 153 153 166 196 206 211 213 217 217 219 208
183 136 104 101 107 108 116 119 118 122 124 117 122
119 123 126 120 119 122 122 121 121 122 123 123 125
126 123 125 116 126 125 128 126 125 126 126 122 116
118 116 120 148 169 172 139

(1) Each row of the image "Leena" is compressed with the OptimalPLR method. For example, for the first row, the compression points obtained after the processing are as follows:

Function 2: 113 segments
(1,161.6),(2,162.4),(3,159.6),(4,161.4),(5,163.6),(6, 159.4),(7,158.6),(8,156.4),(9, 155.6),(10,161.4),(11,153.8), (13,155.4),(14,152.8),(17,155.2),(18,156.8),(20,164. 4),(21, 164.6),(22,168.4),(23,172.6),(24,171.4),(25,170.6),(26, 171.4),(27,167.6),(28,160.4),(29,149.6),(30,146.4),(31, 123.6),(32,112.4),(33,94.6),(34,92.4),(35,92 0.6),(36, 100.4),(37,100.6),(38,104.4),(39,103.8),(41,109.4),(42, 104.6),(43,106.4),(44,108.6),(46,106.2),(47,108.6),(48, 108.4),(49,108.6),(50,109.4),(51,103.6),(52,1 06.4),(53, 109.6),(54,114.4),(55,113.6),(56,120.4),(57,114.6),(58, 121.4),(59,122. 6),(60,122.4),(61,126.6),(62,126.4),(63, 122.6),(64,132.4),(65,129.6),(66,132.4),(67,128.6),(68, 129.4),(69,133.8),(71,131.4),(72,127.6),(73,130.4),(74, 126.6),(75,1 31.4),(76,128.6),(77,130.4),(78,127.6),(79, 134.4),(80,133.6),(81,129.4),(82,132.6),(84,134.2),(85, 132.6),(86,134.4),(87,132.6),(89,134.2),(90,132.6),(91, 131.4),(9 2,130.6),(94,135.4),(95,130.6),(96,131.4),(97, 133.6),(98,133.4),(99,135.6),(102,1 34.4),(103,135.6),(104, 132.4),(105,135.6),(109,129.2),(110,129.6),(111,131.4),(1 12,129.6),(113,129.4),(114,133.6),(115,134.4),(116,131.6), (117,133.4),(118,131.6),(119,130.4),(120,131.6),(121, 135.4),(122,132.6),(123,133.4),(124,135.6),(125,1 31.4), (126,130.6),(127,128.4),(128,134.6),(129,141.4),(130, 132.6),(132,128.2),(1 33,132.6),(134,130.4),(135,132.6), (136,128.4),(137,126.6),(138,131.4),(139,127.6),(140, 134.4),(141,127.6),(142,127.4),(143,129.8),(145,129.4), (146,129.6),(148,1 27.2),(149,127.6),(150,127.4),(151, 128.6),(152,128.4),(153,121.6),(154,123.4),(1 55,119.6), (156,120.4),(157,114.6),(159,109.4),(160,100.6),(161, 107.4),(162,115.6),(164,137.2),(165,140.6),(166,148.4), (167,152.6),(170,160.4),(171,160.6),(172,1 54.4),(173, 148.6),(177,154.2),(178,152.6),(179,155.4),(180,153.6), (181,158.4),(1 82,156.6),(183,153.4),(184,153.6),(185, 152.4),(186,153.2),(189,151.4),(190,153.6),(191,155.4), (192,150.6),(193,155.4),(194,156.6),(195,157.4),(196, 153.8),(198,1 59.4),(199,156.6),(200,153.4),(201,152.6), (202,166.4),(203,195.6),(204,206.4),(2 05,210.6),(206, 213.4),(207,216.6),(208,217.4),(209,218.6),(210,208.4), (211,182.6),(212,136.4),(213,103.6),(214,101.4),(215, 106.6),(216,108.4),(217,115.6),(218,1 19.4),(219,117.6), (220,122.4),(221,123.6),(222,117.4),(223,121.6),(224, 119.4),(22 5,122.6),(226,126.4),(227,119.6),(228,119.4), (229,121.8),(232,121.2),(233,121.8),(235,123.4),(236, 124.6),(237,126.4),(238,122.6),(239,125.4),(240,115.6), (241,12 6.4),(242,124.6),(243,128.4),(244,125.6),(245, 125.4),(246,125.6),(247,126.4),(24 8,121.6),(249,116.4), (250,117.6),(251,116.6),(252,119.6),(253,148.4),(254, 168.6),(255,172.4),(256,139)

(2) Adjacent points are stretched under Policy II, for example: for a line segment (2, 162.4), (3,159.6), extended pixel information (2*2, 162.4) and (3*2, 159.6) is obtained according to a row extension factor 2; then, a straight line formed by the two points is calculated with a formula y=−1.4*x+168 (4<=x<=6); points (4, 162.4), (5, 161), and (6, 159.6) are obtained by filling with the straight line, and then the points are rounded to (4, 162), (5, 161), and (6, 160).

(3) The operations in the steps (1) and (2) are performed for each row, to obtain an image stretched by 2 times in the row direction. See the annex enlargerow.txt for the detailed pixel information.

Figure 6:
FIG. 6 shows the result of upscaling by two times in the horizontal direction under Policy II with the PLAScale method.
Figure 7:
FIG. 7 shows the result of upscaling by two times in the horizontal direction and longitudinal direction respectively under Policy II with the PLAScale method.

(4) The columns of the image shown in FIG. 6 are processed according to the operations in the steps (1), (2), and (3), to obtain a final image upscaled at a factor 2*2 as shown in FIG. 7.

To prove the advantages of the scaling algorithm put forth in the present invention, here the method provided in the present invention is compared with four common Kernel-based interpolation scaling methods (adopted in Adobe Photoshop): Nearest Neighbor, Bilinear, Bicubic, and Lanczos. All of the methods are implemented in C++ language under Eclipse, and an Open Source Computer Vision Library (OpenCV) integrated package is utilized. The platform for the experiment is based on a Lenovo ThankPad T450 laptop computer, which has the following parameters: Intel Core i7-5500U 2.40 GHz, 2.40 GHz and 12 G memory. Wherein, the Error bound used for the PLA compression algorithm is 0.4.

Figure 8:
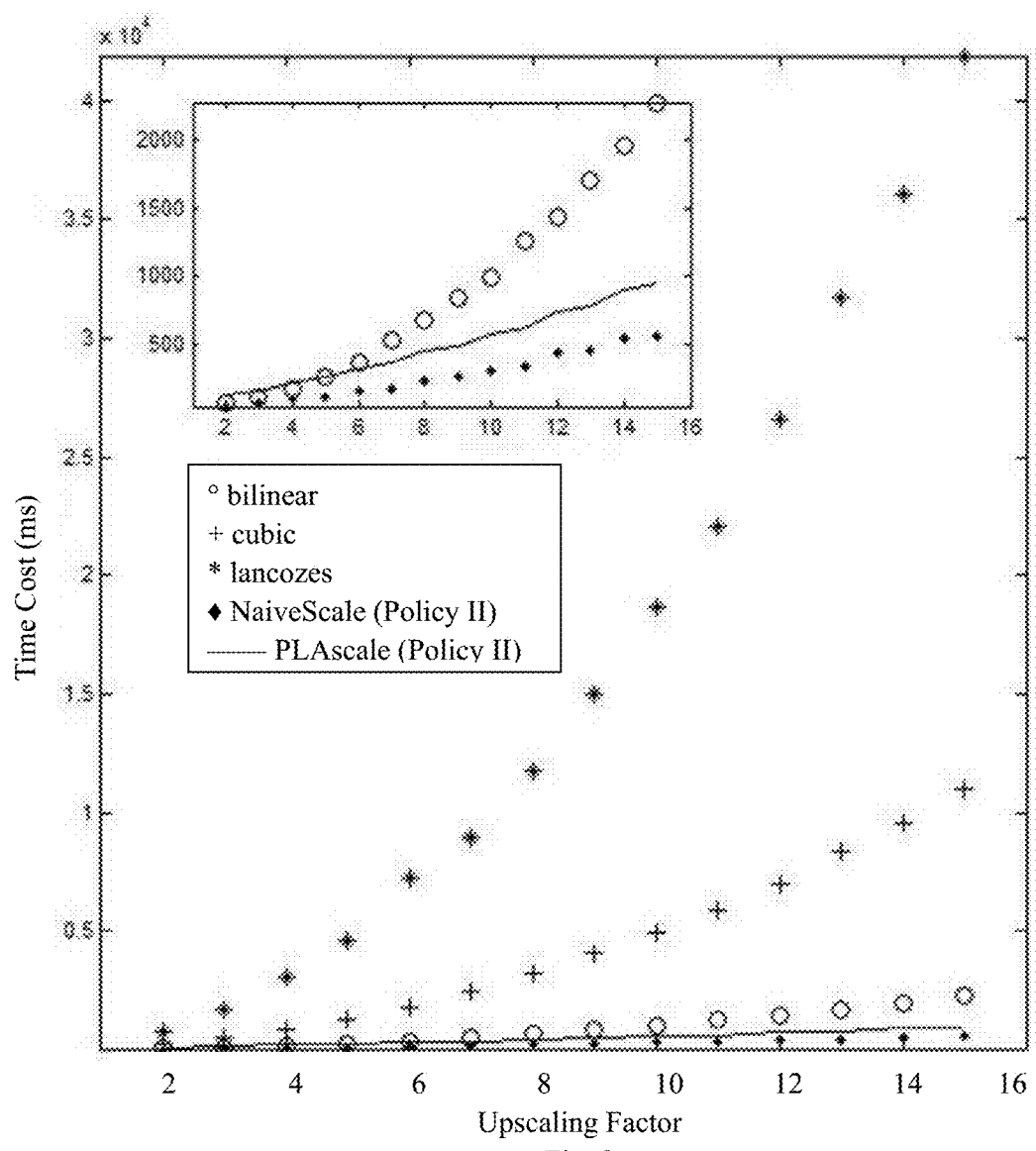
FIG. 8 is a schematic diagram of comparison of time cost between scaling FIG. 5 with the NaiveScale and PLAscale methods and scaling with the classical interpolation methods.
Figure 9:
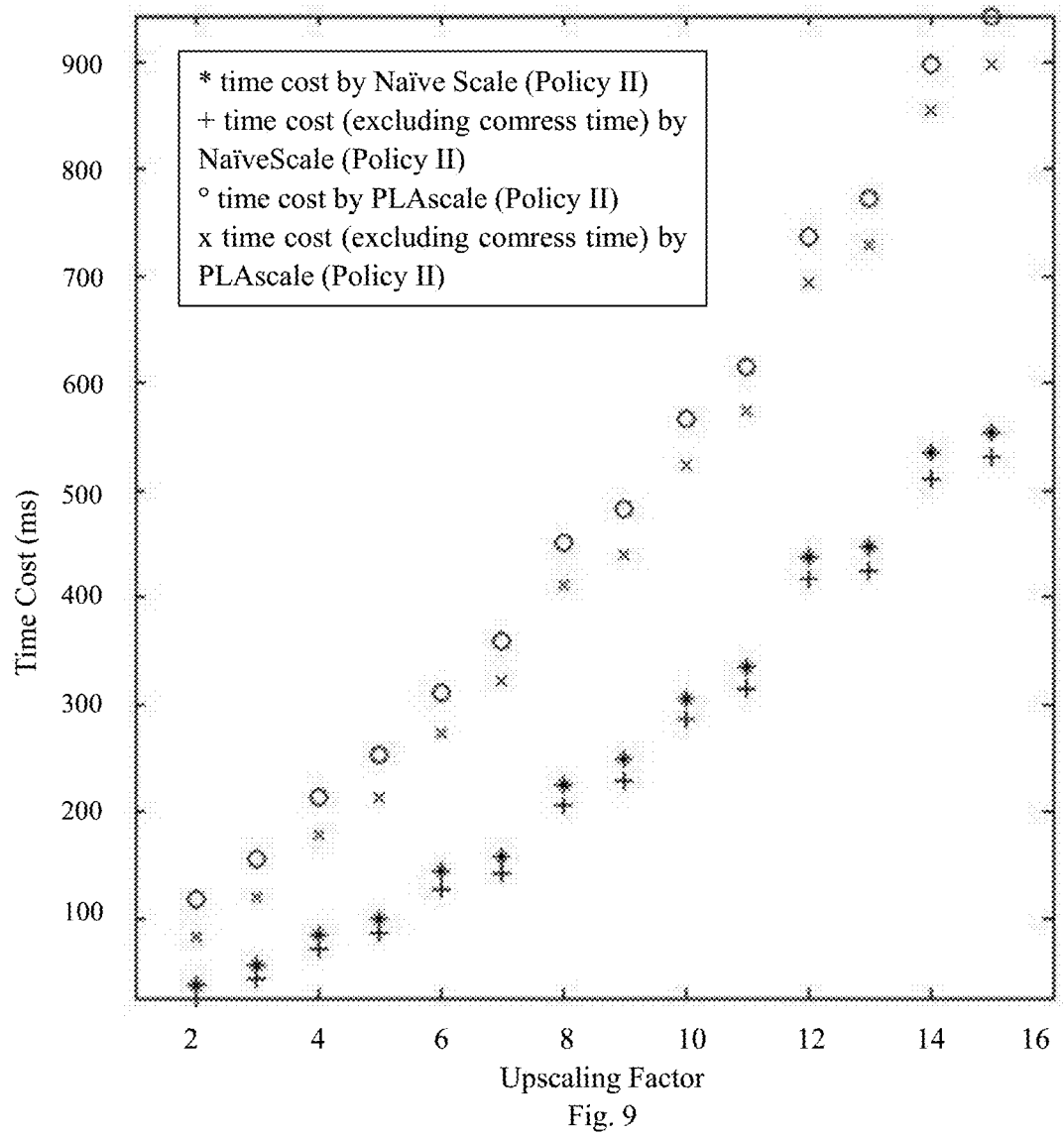
FIG. 9 is a schematic diagram of comparison of the time cost with the NaiveScale and PLAscale methods in FIG. 5 with and without consideration of the time cost.
Figure 10:
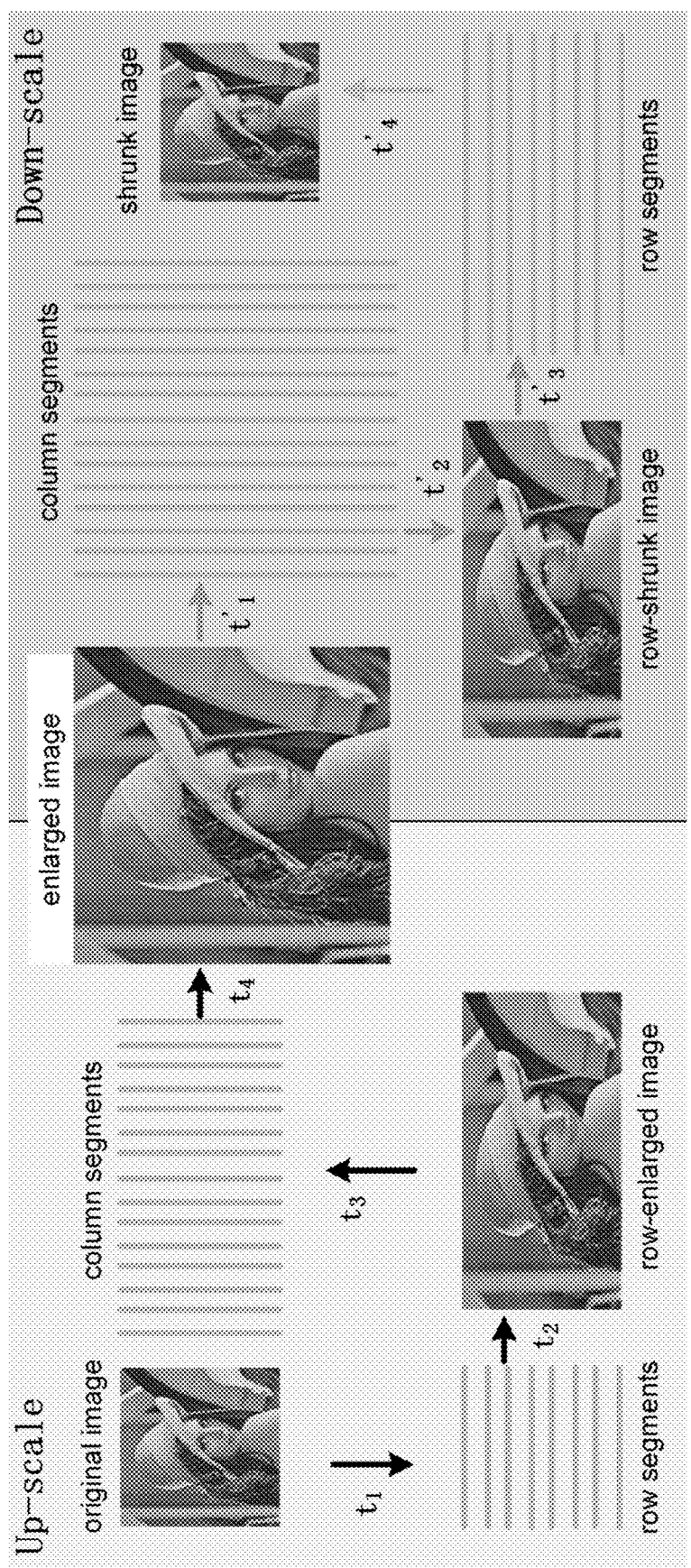
FIG. 10 is a flowchart depicting an overview of the instant invention.

As shown in FIGS. 8 and 9, the upscaling performance of Bilinear, Cubic, and Lancozes is much lower than that of PLAScale and NaiveScale for image upscaling at a large upscaling factor. For example, the time costs are 2.4 s, 12 s, 43 s, 1 s, and 0.5 s respectively when the upscaling factor is set to 15. The difference in time efficiency ascribes to the difference between the idea of Kernel-based interpolation methods and the ideal of the method provided in the present invention. Each new pixel reconstructed with the Bilinear, Cubic, or Lancozes method is based on the peripheral pixels, and 4, 16, and 64 neighboring pixels are used in those methods respectively. In contrast, the method put forth in the present invention employs two compression points to form a straight line to reconstruct new pixels to be filled in. It is worthy to note that the NaiveScale method has higher time efficiency than the PLAScale method, owing to a fact that the PLAScale method has to compute "Convex Hulls" additionally.

FIGS. 8 and 9 provide schematic diagrams of comparison of overall time (the sum of compression time and scaling time) between the method provided in the present invention and the classical interpolation scaling methods on FIG. 5.

The specific method in this embodiment is as follows:

An image scaling method based on a linear extension/contraction mode, comprising the following steps:

step I: compressing an original image matrix (1) composed of image pixels in a row by row manner with a Linearlization or OptimalPLR compression method to obtain a line segment segmentation form, which is data after compression; suppose the original image matrix (1) is as follows:

$$I = \begin{bmatrix} i_{11} & i_{12} & \cdots & i_{1n} \\ i_{21} & i_{22} & \cdots & i_{2n} \\ \vdots & \vdots & \vdots & \vdots \\ i_{m1} & i_{m2} & \cdots & i_{mn} \end{bmatrix} \quad (1)$$

where, $i_{mn}$ is the pixel value in row m, column n in the original image matrix;

each row of data is denoted as $I_i=\{i_{i1}, i_{i2}, \ldots, i_{in}\}$, where, i is the subscript of row i, $I_i$ is regarded as the value of a time series, i.e., time series SI=$\{(1, i_{i1}), (2, i_{i2}), (k, i_{ik}), \ldots, (n, i_{in})\}$, where, k=1, 2, . . . , n;

the time series SI is compressed with the Linearlization or OptimalPLR compression method to obtain a compression result series Sc, the specific compression method is as follows:

(3) compressing with the Linearlization compression method as follows:

storing the first point $(1, i_{i1})$ in the time series SI in the compression result series Sc; forming a straight line $L_{current}$ with the point $(1, i_{i1})$ stored in the compression result series Sc and an adjacent point $(2, i_{i2})$ after that point in the time series SI, and judging whether an adjacent point $(3, i_{i3})$ after the point $(2, i_{i2})$ in the time series SI is in the straight line $L_{current}$; if the point $(3, i_{i3})$ is in the straight line $L_{current}$, further judging whether the follow-up adjacent points are in the straight line $L_{current}$, and so on sequentially, till a point $(k, i_{ik})$ in the time series SI is not in the straight line $L_{current}$; at that point, storing a point $(k-1, i_{i(k-1)})$ before the point $(k, i_{ik})$ not in the straight line $L_{current}$ in the compression result series Sc; then, taking the point $(k, i_{ik})$ not in the straight line $L_{current}$ as a new first point and repeating the above-mentioned steps, and so on, till the compression of SI=$\{(1, i_{i1}), (2, i_{i2}), \ldots, (n, i_{in})\}$ is finished;

(4) compressing with the OptimalPLR compression method as follows:

specifying a maximum error $\delta$, and SI=$\{(1, i_{i1}), (2, i_{i2}), \ldots, (k, i_{ik}), \ldots, (n, i_{in})\}$, adding or subtracting the maximum error $\delta$ to/from the vertical coordinate of each point starting from the first point $(1, i_{i1})$, utilizing two points $(1, i_{i1}-\delta)$ and $(2, i_{i2}+\delta)$ to form a maximum straight line $L_{max}$, utilizing two points $(1, i_{i1}+\delta)$ and $(2, i_{i2}-\delta)$ to form a minimum straight line $L_{min}$, and then making two judgments: firstly, judging whether a line segment composed of two points $(3, i_{i3}+\delta)$ and $(3, i_{i3}-\delta)$ corresponding to the third point $(3, i_{i3})$ is contained in an included angle space formed by the maximum straight line $L_{max}$ and the minimum straight line $L_{min}$ that intersect with each other; secondly, judging whether a line segment composed of two points $(3, i_{i3}+\delta)$ and $(3, i_{i3}-\delta)$ corresponding to the third point $(3, i_{i3})$ intersects with the maximum straight line $L_{max}$ or intersects with the minimum straight line $L_{min}$; if either of the results of the two judgments is positive, it indicates there is a straight line that makes the currently processed points $(1, i_{i1})$, $(2, i_{i2})$, and $(3, i_{i3})$ within the error limit of the $\delta$; in that case, updating the slopes of the maximum straight line $L_{max}$ and the minimum straight line $L_{min}$ with the following formulae (2):

$$\begin{cases} L_{min}[1, k+1] = \max_{1 \le q < w \le k} \dfrac{(i_{iq}+\delta)-(i_{iw}-\delta)}{q-w} \\ L_{max}[1, k+1] = \min_{1 \le q < w \le k} \dfrac{(i_{iq}-\delta)-(i_{iw}+\delta)}{q-w} \end{cases} \quad (2)$$

where, $L_{min}[1, k+1]$ and $L_{max}[1, k+1]$ represent the slopes of $L_{min}$ and $L_{max}$ respectively in the case that the result of judgment on the $k^{th}$ point $(k, i_{ik})$ is positive;

q and w traverse all integral values within the interval [1, k], and $1 \le q < w \le k$;

further making the above two judgments on a line segment composed of the follow-up two points $(4, i_{i4}+\delta)$ and $(4, i_{i4}-\delta)$; if either of the results of the two judgments is positive, further updating the maximum straight line $L_{max}$ and the minimum straight line $L_{min}$ with the formulae (2), and so on, till the result of judgment on points $(k, i_{ik}+\delta)$ and $(k, i_{ik}-\delta)$ is negative; at that point, selecting the maximum straight line $L_{max}$ or the minimum straight line $L_{min}$ that is updated in the last time to calculate vertical coordinates $i_{i1}'$ and corresponding to x=1 and x=k-1 in the time series SI, and storing obtained first compression storage point $c_1=(1, i_{i1}')$ and second compression storage point $c_2=(k-1, i_{ik-1}')$ in the compression result series Sc;

the method for utilizing the maximum straight line $L_{max}$ or the minimum straight line $L_{min}$ that is updated in the last time to calculate a start point $(1, i_{i1}')$ and end point $(k-1, i_{ik-1}')$ is as follows:

the maximum straight line is $L_{max}=a_{max}x+b_{max}$, and the minimum straight line is $L_{min}=a_{min}x+b_{min}$, wherein, to obtain the vertical coordinates $i_{i1}'$ and $i_{ik-1}'$ corresponding to the two points $(1, i_{i1}')$ and $(k-1, i_{ik-1}')$ with $a_{max}$, $b_{max}$, $a_{min}$, and $b_{min}$, x=1 and x=k-1 must be substituted into the maximum straight line $L_{max}$ or the minimum straight line $L_{min}$ at the same time; for example, $i_{i1}'=a_{max}*1+b_{max}$ and $i_{ik-1}'=a_{max}*(k-1)+b_{max}$ are obtained when they are substituted into the maximum straight line $L_{max}$, and $i_{i1}'=a_{min}*1+b_{min}$ and $i_{ik-1}'=a_{min}*(k-1)+b_{min}$ are obtained when they are substituted into the minimum straight line $L_{min}$;

further taking follow-up two points $(k, i_{ik}-\delta)$ and $(k+1, i_{i(k+1)}+\delta)$ to form a maximum straight line $L_{max}$ and taking two points $(k, i_{ik}+\delta)$ and $(k+1, i_{i(k+1)}-\delta)$ to form a minimum straight line $L_{min}$, and repeating the above-mentioned process, and so on, till the processing of SI=$\{(1, i_{i1}), (2, i_{i2}), \ldots, (n, i_{in})\}$ is finished;

through the above-mentioned compression process, a compression result series Sc=$(c_1, c_2, \ldots, c_i, \ldots, c_p)$ is obtained for each row, where, p<n, and $c_i$ represents compression storage point i;

step II: lengthening the line segments under Policy I or Policy II or shortening the line segments by resampling at a corresponding upscaling or downscaling factor, to obtain an upscaled or downscaled image in the row direction, the specific method is as follows:

(3) obtaining an upscaled image in the row direction as follows:

with a presumption that the upscaling factor in the row direction is h, multiplying the horizontal coordinate $c_i.x$ of each compression storage point $c_i$ ($1 \le i \le p$) in the compression result series Sc by h, while keeping the vertical coordinate $c_i.y$ of that point unchanged, to obtain a set of compression storage points $\{(c_1.x*h, c_1.y), (c_2.x*h, c_2.y), \ldots, (c_i.x*h, c_i.y), \ldots, (c_p.x*h, c_p.y)\}$, where, $c_p.x=n$;

under the Policy I, if $c_{i+1}.x-c_i.x>1$, utilizing two adjacent compression storage points $(c_i.x*h, c_i.y)$ and $(c_{i+1}.x*h, c_{i+1}.y)$ to form a straight line and fill up the value of any point within the range of positions $(c_i.x*h, c_{i+1}.x]$; if $c_{i+1}.x-c_i.x=1$, utilizing $c_{i+1}.y$ directly to fill up the value of each point within the range of positions $(c_i.x*h, c_{i+1}.x*h]$;

under the Policy II, regardless of $c_{i+1}.x-c_i.x>1$ or $c_{i+1}.x-c_i.x=1$, utilizing the straight line formed by the two adjacent compression storage points $(c_i.x*h, c_i.y)$ and $(c_{i+1}.x*h, c_{i+1}.y)$ to fill up the value of any point within the range of positions $(c_i.x*h, c_{i+1}.x*h]$;

(4) obtaining a downscaled image in the row direction as follows:

with a presumption that the downscaling factor in the row direction is h, dividing the horizontal coordinate $c_i.x$ of each compression storage point $c_i$ ($1 \le i \le p$) in the compression result series Sc by h, while keeping the vertical coordinate $c_i.y$ of that point unchanged, to obtain a set of compression storage points $\{(c_1.x/h, c_1.y), (c_2.x/h, c_2.y), \ldots, (c_i.x/h, c_i.y), \ldots, (c_p.x/h, c_p.y)\}$, where, $c_p.x=n$;

here, utilizing a straight line formed by two adjacent compression storage points $(c_i.x/h, c_i.y)$ and $(c_{i+1}.x/h, c_{i+1}.y)$ to fill up the value of any point within the range of positions $(c_i.x/h, c_{i+1}.x/h]$;

step III: upscaling the data upscaled in the row direction in the step II in a column by column manner through the process in the step II, to obtain an image upscaled in the column direction, and thereby obtain an entire upscaled image; or downscaling the data downscaled in the row direction in the step II in a column by column manner through the process in the step II, to obtain an image downscaled in the column direction, and thereby obtain an entire downscaled image.

While the above detailed description is the specific description to the feasible embodiments in the present invention, the scope of the present invention is not limited to those embodiments. Any equivalent implementation or modification without departing from the spirit of the present invention shall be deemed as falling in the protection scope of the present application.

The invention claimed is:

1. An image scaling method based on a linear extension/contraction mode, comprising the following steps:

step I: compressing an original image matrix (1) composed of image pixels in a row by row manner with a Linearlization or OptimalPLR compression method to obtain a line segment segmentation form, which is data after compression; suppose the original image matrix (1) is as follows:

$$I = \begin{bmatrix} i_{11} & i_{12} & \ldots & i_{1n} \\ i_{21} & i_{22} & \ldots & i_{2n} \\ \vdots & \vdots & \vdots & \vdots \\ i_{m1} & i_{m2} & \ldots & i_{mn} \end{bmatrix} \quad (1)$$

where, $i_{mn}$ is the pixel value in row m, column n in the original image matrix;

each row of data is denoted as $I_i=\{i_{i1}, i_{i2}, \ldots, i_{in}\}$ where, i is the subscript of row i, $I_i$ is regarded as the value of a time series, i.e., time series $SI=\{(1, i_{i1}), (2, i_{i2}), \ldots, (k, i_{ik}), \ldots, (n, i_{in})\}$, where, $k=1, 2, \ldots, n$;

the time series SI is compressed with the Linearlization or OptimalPLR compression method to obtain a compression result series Sc;

step II: lengthening the line segments under Policy I or shortening the line segments under Policy II by resampling at a corresponding upscaling or downscaling factor, to obtain an upscaled or downscaled image in the row direction;

step III: upscaling the data upscaled in the row direction in the step II in a column by column manner through the process in the step II, to obtain an image upscaled in the column direction, and thereby obtain an entire upscaled image; or downscaling the data downscaled in the row direction in the step II in a column by column manner through the process in the step II, to obtain an image downscaled in the column direction, and thereby obtain an entire downscaled image.

2. The image scaling method based on a linear extension/contraction mode according to claim 1, wherein, in the step I, the time series SI is compressed with the Linearlization or OptimalPLR compression method to obtain a compression result series Sc, wherein, the compression with the Linearlization compression method is as follows:

storing the first point $(1, i_{i1})$ in the time series SI in the compression result series Sc; forming a straight line $L_{current}$ with the point $(1, i_{i1})$ stored in the compression result series Sc and an adjacent point $(2, i_{i2})$ after that point in the time series SI, and judging whether an adjacent point $(3, i_{i3})$ after the point $(2, i_{i2})$ in the time series SI is in the straight line $L_{current}$; if the point $(3, i_{i3})$ is in the straight line $L_{current}$, further judging whether the follow-up adjacent point is in the straight line $L_{current}$, and so on sequentially, till a point $(k, i_{ik})$ in the time series SI is not in the straight line $L_{current}$; at that point, storing a point $(k-1, i_{i(k-1)})$ before the point $(k, i_{ik})$ not in the straight line $L_{current}$ in the compression result series Sc; then, taking the point $(k, i_{ik})$ not in the straight line $L_{current}$ as a new first point and repeating the above-mentioned steps, and so on, till the compression of $SI=\{(1, i_{i1}), (2, i_{i2}), \ldots, (k, i_{ik}), \ldots, (n, i_{in})\}$ is finished, where, $k=1, 2, \ldots, n$.

3. The image scaling method according to claim 2, wherein, in the step II is specifically as follows:

(1) obtaining an upscaled image in the row direction as follows:

with a presumption that the upscaling factor in the row direction is h, multiplying the horizontal coordinate $c_i.x$ of each compression storage point $c_i$ ($1 \leq i \leq p$) in the compression result series Sc by h, while keeping the vertical coordinate $c_i.y$ of that point unchanged, to obtain a set of compression storage points $\{(c_1.x*h, c_1.y), (c_2.x*h, c_2.y), \ldots, (c_i.x*h, c_i.y), \ldots, (c_p.x*h, c_p.y)\}$, where, $c_p.x=n$;

under Policy I, if $c_{i+1}.x-c_i.x>1$, utilizing two adjacent compression storage points $(c_i.x*h, c_i.y)$ and $(c_{i+1}.x*h, c_{i+1}.y)$ to form a straight line and fill up the value of any point within the range of positions $(c_i.x*h, c_{i+1}.x]$; if $c_{i+1}.x-c_i.x=1$, utilizing $c_{i+1}.y$ directly to fill up the value of each point within the range of positions $(c_i.x*h, c_{i+1}.x*h]$;

under Policy II, regardless of $c_{i+1}.x-c_i.x>1$ or $c_{i+1}.x-c_i.x=1$, utilizing the straight line formed by the two adjacent compression storage points $(c_i.x*h, c_i.y)$ and $(c_{i+1}.x*h, c_{i+1}.y)$ to fill up the value of any point within the range of positions $(c_i.x*h, c_{i+1}.x*h]$;

(2) obtaining a downscaled image in the row direction as follows:

with a presumption that the downscaling factor in the row direction is h, dividing the horizontal coordinate $c_i.x$ of each compression storage point $c_i$ ($1 \leq i \leq p$) in the compression result series Sc by h, while keeping the vertical coordinate $c_i.y$ of that point unchanged, to obtain a set of compression storage points $\{(c_1.x/h, c_1.y), (c_2.x/h, c_2.y), (c_i.x/h, c_i.y), \ldots, (c_p.x/h, c_p.y)\}$, where, $c_p.x=n$;

here, utilizing a straight line formed by two adjacent compression storage points $(c_i.x/h, c_i.y)$ and $(c_{i+1}.x/h, c_{i+1}.y)$ to fill up the value of any point within the range of positions $(c_i.x/h, c_{i+1}.x/h]$.

4. The image scaling method according to claim 1, wherein, in the step I, the time series SI is compressed with the Linearlization or OptimalPLR compression method to obtain a compression result series Sc, wherein, the compression with the OptimalPLR compression method is as follows:

specifying a maximum error $\delta$, and $SI=\{(1, i_{i1}), (2, i_{i2}), (k, i_{ik}), \ldots, (n, i_{in})\}$, where, $k=1, 2, \ldots, n$, adding or subtracting the maximum error $\delta$ to/from the vertical coordinate of each point starting from the first point (1, $i_{i1}$), utilizing two points (1, $i_{i1}-\delta$) and (2, $i_{i2}+\delta$) to form a maximum straight line $L_{max}$, utilizing two points (1, $i_{i1}+\delta$) and (2, $i_{i2}-\delta$) to form a minimum straight line $L_{min}$, and then making two judgments: firstly, judging whether a line segment composed of two points (3, $i_{i3}+\delta$) and (3, $i_{i3}-\delta$) corresponding to the third point (3, $i_3$) is contained in an included angle space formed by the maximum straight line $L_{max}$ and the minimum straight line $L_{min}$ that intersect with each other; secondly, judging whether a line segment composed of two points (3, $i_3+\delta$) and (3, $i_3-\delta$) corresponding to the third point (3, $i_{i3}$) intersects with the maximum straight line $L_{max}$ or intersects with the minimum straight line $L_{min}$; if either of the results of the two judgments is positive, it indicates there is a straight line that makes the currently processed points (1, $i_{i1}$), (2, $i_{i2}$), and (3, $i_{i3}$) within the error limit of the $\delta$; in that case, updating the slopes of the maximum straight line $L_{max}$ and the minimum straight line $L_{min}$ with the following formulae (2):

$$\begin{cases} L_{min}[1, k+1] = \max_{1 \leq q < w \leq k} \dfrac{(i_{iq}+\delta)-(i_{iw}-\delta)}{q-w} \\ L_{max}[1, k+1] = \min_{1 \leq q < w \leq k} \dfrac{(i_{iq}-\delta)-(i_{iw}+\delta)}{q-w} \end{cases} \quad (2)$$

where, $L_{min}[1, k+1]$ and $L_{max}[1, k+1]$ represent the slopes of $L_{min}$ and $L_{max}$ respectively in the case that the result of judgment on the $k^{th}$ point (k, $i_k$) is positive;

q and w traverse all integral values within the interval [1, k], and $1 \leq q < w \leq k$;

further making the above two judgments on a line segment composed of the follow-up two points (4, $i_{i4}+\delta$) and (4, $i_{i4}-\delta$); if either of the results of the two judgments is positive, further updating the maximum straight line $L_{max}$ and the minimum straight line $L_{min}$ with the formulae (2), and so on, till the result of judgment on points (k, $i_{ik}+\delta$) and (k, $i_{ik}-\delta$) is negative; at that point, selecting the maximum straight line $L_{max}$ or the minimum straight line $L_{min}$ that is updated in the last time to calculate vertical coordinates $i_{i1}'$ and $i_{ik-1}'$ corresponding to x=1 and x=k−1 in the time series SI, and storing obtained first compression storage point $c_1=(1, i_{i1}')$ and second compression storage point $c_2=(k-1, i_{ik-1}')$ in the compression result series Sc;

further taking follow-up two points (k, $i_{ik}-\delta$) and (k+1, $i_{i(k+1)}+\delta$) to form a maximum straight line $L_{max}$ and taking two points (k, $i_{ik}+\delta$) and (k+1, $i_{i(k+1)}-\delta$) to form a minimum straight line $L_{mm}$, and repeating the above-mentioned process, and so on, till the processing of $SI = \{(1, i_{i1}), (2, i_{i2}), \ldots, (n, i_{in})\}$ is finished;

through the above-mentioned compression process, a compression result series $Sc = \{c_1, c_2, \ldots, c_i, \ldots, c_p\}$ is obtained for each row, where, p<n, and $c_i$ represents compression storage point i.

5. The image scaling method according to claim 4, wherein, in the step II is specifically as follows:

(1) obtaining an upscaled image in the row direction as follows:

with a presumption that the upscaling factor in the row direction is h, multiplying the horizontal coordinate $c_i.x$ of each compression storage point $c_i$ ($1 \leq i \leq p$) in the compression result series Sc by h, while keeping the vertical coordinate $c_i.y$ of that point unchanged, to obtain a set of compression storage points $\{(c_1.x*h, c_1.y), (c_2.x*h, c_2.y), \ldots, (c_i.x*h, c_i.y), (c_p.x*h, c_p.y)\}$, where, $c_p.x=n$;

under Policy I, if $c_{i+1}.x - c_i.x > 1$, utilizing two adjacent compression storage points $(c_i.x*h, c_i.y)$ and $(c_{i+1}.x*h, c_{i+1}.y)$ to form a straight line and fill up the value of any point within the range of positions $(c_i.x*h, c_{i+1}.x]$; if $c_{i+1}.x - c_i.x = 1$, utilizing $c_{i+1}.y$ directly to fill up the value of each point within the range of positions $(c_i.x*h, c_{i+1}.x*h]$;

under Policy II, regardless of $c_{i+1}.x - c_i.x > 1$ or $c_{i+1}.x - c_i.x = 1$, utilizing the straight line formed by the two adjacent compression storage points $(c_i.x*h, c_i.y)$ and $(c_{i+1}.x*h, c_{i+1}.y)$ to fill up the value of any point within the range of positions $(c_i.x*h, c_{i+1}.x*h]$;

(2) obtaining a downscaled image in the row direction as follows:

with a presumption that the downscaling factor in the row direction is h, dividing the horizontal coordinate $c_i.x$ of each compression storage point $c_i$ ($1 \leq i \leq p$) in the compression result series Sc by h, while keeping the vertical coordinate $c_i.y$ of that point unchanged, to obtain a set of compression storage points $\{(c_1.x/h, c_1.y), (c_2.x/h, c_2.y), \ldots, (c_i.x/h, c_i.y), \ldots, (c_p.x/h, c_p.y)\}$, where, $c_p.x=n$;

here, utilizing a straight line formed by two adjacent compression storage points $(c_i.x/h, c_i.y)$ and $(c_{i+1}.x/h, c_{i+1}.y)$ to fill up the value of any point within the range of positions $(c_i.x/h, c_{i+1}.x/h]$.

6. The image scaling method according to claim 4, wherein, in the method for compressing with the OptimalPLR compression method in the step I, the method for utilizing the maximum straight line $L_{max}$ or the minimum straight line $L_{min}$ that is updated in the last time to calculate a start point (1, $i_{i1}'$) and end point (k−1, $i_{ik-1}'$) is as follows:

the maximum straight line is $L_{max} = a_{max}x + b_{max}$, and the minimum straight line is $L_{min} = a_{min}x + b_{min}$, wherein, to obtain the vertical coordinates $i_{i1}'$ and $i_{ik-1}'$ corresponding to the two points (1, $i_{i1}'$) and (k−1, $i_{ik-1}'$) with $a_{max}$, $b_{max}$, $a_{min}$, and $b_{min}$, x=1 and x=k−1 must be substituted into the maximum straight line $L_{max}$ or the minimum straight line $L_{min}$ at the same time; for example, $i_{i1}' = a_{max}*1 + b_{max}$ and $i_{ik-1}' = a_{max}*(k-1) + b_{max}$ are obtained when they are substituted into the maximum straight line $L_{max}$, and $i_{i1}' = a_{min}*1 + b_{min}$ and $i_{ik-1}' = a_{min}*(k-1) + b_{min}$ are obtained when they are substituted into the minimum straight line $L_{min}$.

7. The image scaling method according to claim 1, wherein, in the step II is specifically as follows:

(1) obtaining an upscaled image in the row direction as follows:

with a presumption that the upscaling factor in the row direction is h, multiplying the horizontal coordinate $c_i.x$ of each compression storage point $c_i$ ($1 \leq i \leq p$) in the compression result series Sc by h, while keeping the vertical coordinate $c_i.y$ of that point unchanged, to obtain a set of compression storage points $\{(c_1.x*h, c_1.y), (c_2.x*h, (c_i.x*h, c_i.y), \ldots, (c_p.x*h, c_p.y)\}$, where, $c_p.x=n$;

under Policy I, if $c_{i+1}.x - c_i.x > 1$, utilizing two adjacent compression storage points $(c_i.x*h, c_i.y)$ and $(c_{i+1}.x*h, c_{i+1}.y)$ to form a straight line and fill up the value of any point within the range of positions $(c_i.x*h, c_{i+1}.x]$; if $c_{i+1}.x - c_i.x = 1$, utilizing directly to fill up the value of each point within the range of positions $(c_i.x*h, c_{i+1}.x*h]$;

under Policy II, regardless of $c_{i+1}.x-c_i.x>1$ or $c_{i+1}.x-c_i.x=1$, utilizing the straight line formed by the two adjacent compression storage points $(c_i.x*h, c_i.y)$ and $(c_{i+1}.x*h, c_{i+1}.y)$ to fill up the value of any point within the range of positions $(c_i.x*h, c_{i+1}.x*h]$;

(2) obtaining a downscaled image in the row direction as follows:

with a presumption that the downscaling factor in the row direction is h, dividing the horizontal coordinate $c_i.x$ of each compression storage point $c_i$ $(1\leq i\leq p)$ in the compression result series Sc by h, while keeping the vertical coordinate $c_i.y$ of that point unchanged, to obtain a set of compression storage points $\{(c_1.x/h, c_1.y), (c_2.x/h, c_2.y), (c_i.x/h, c_i.y), \ldots, (c_p.x/h, c_p.y)\}$, where, $c_p.x=n$;

here, utilizing a straight line formed by two adjacent compression storage points $(c_i.x/h, c_i.y)$ and $(c_{i+1}.x/h, c_{i+1}.y)$ to fill up the value of any point within the range of positions $(c_i.x/h, c_{i+1}.x/h]$.

* * * * *